(12) United States Patent
Chang et al.

(10) Patent No.: US 7,995,686 B2
(45) Date of Patent: Aug. 9, 2011

(54) SYSTEM AND METHOD FOR CO-CHANNEL INTERFERENCE CANCELLATION IN CELLULAR OFDM SYSTEMS

(75) Inventors: Kyung Hi Chang, Seoul (KR); Manar Mohaisen, Incheon (KR)

(73) Assignee: Inha-Industry Partnership Institute, Incheon (KR)

(*) Notice: Subject to any disclaimer, the term of this patent is extended or adjusted under 35 U.S.C. 154(b) by 752 days.

(21) Appl. No.: 11/679,569

(22) Filed: Feb. 27, 2007

(65) Prior Publication Data
US 2008/0187065 A1 Aug. 7, 2008

(30) Foreign Application Priority Data

Feb. 6, 2007 (KR) .................. 10-2007-0012088

(51) Int. Cl.
H03D 1/04 (2006.01)
H03D 1/06 (2006.01)
H04B 1/10 (2006.01)
(52) U.S. Cl. ........................... 375/346; 370/203
(58) Field of Classification Search .......... 375/346–350; 370/203–211
See application file for complete search history.

(56) References Cited

U.S. PATENT DOCUMENTS

| 4,748,639 | A * | 5/1988 | Feggeler ............... | 375/285 |
|---|---|---|---|---|
| 2004/0101068 | A1 | 5/2004 | Wang et al. .............. | 374/324 |
| 2005/0122998 | A1 | 6/2005 | Kamerman et al. ........ | 370/478 |
| 2005/0136840 | A1* | 6/2005 | Molnar et al. ............ | 455/63.1 |
| 2005/0148355 | A1 | 7/2005 | Naguib et al. ........... | 455/500 |
| 2005/0180760 | A1* | 8/2005 | Feced et al. ............. | 398/183 |
| 2006/0120473 | A1 | 6/2006 | Baum .................. | 375/260 |
| 2006/0126755 | A1* | 6/2006 | Itou .................. | 375/297 |
| 2006/0286997 | A1* | 12/2006 | Seki et al. ............. | 355/525 |

FOREIGN PATENT DOCUMENTS

| EP | 1 471 655 | 6/2006 |
|---|---|---|
| JP | 2003-179528 | 6/2003 |

(Continued)

OTHER PUBLICATIONS

Masaki Shibahara et al., "Performance Evaluation of Frequency Spread Coding and Frequency Interleaving for OFDM Systems Using Adaptive Co-Channel Interference Canceller," Department of Information and Computer Science, Keio University, IEIC Technical Report, pp. 61-66, Jul. 12, 2001, vol. 101, No. 197.

Hitoshi, Yoshino et al., "Adaptive Co-Channel Interference (CCI) Cancellation for OFDM Communication Systems," IEEE, Feb. 15, 2000, pp. 245-250.

*Primary Examiner* — Curtis B Odom
(74) *Attorney, Agent, or Firm* — Morgan, Lewis & Bockius LLP

(57) ABSTRACT

The present invention relates to a system for canceling co-channel interference (CC) in a cellular orthogonal frequency division multiplexing (OFDM) system. The system canceling co-channel interference (CCI) in a cellular orthogonal frequency division multiplexing (OFDM) system comprises a mobile station (MS) receiver including a feedback generation unit for generating a feedback to a base station (BS) so as to control a transmission power of the transmitting frame of the BS, and a maximum likelihood estimation (MLE) CCI cancellation unit for canceling CCI signals arriving from neighbor cells; and a BS transmitter including a closed-loop power control unit for controlling the transmission power of the transmitting frame according to the feedback received from the MS such that received power of desired signal at the MS receiver is different from that of an interferer signal.

25 Claims, 9 Drawing Sheets

FOREIGN PATENT DOCUMENTS

| | | |
|---|---|---|
| KR | 10-2005-0005991 | 1/2005 |
| KR | 10-2005-0102434 | 10/2005 |
| KR | 10-2006-0047736 | 5/2006 |
| KR | 10-2006-0054440 | 5/2006 |
| WO | WO 2005/018213 | 2/2005 |
| WO | WO 2005/107084 | 11/2005 |

* cited by examiner

[FIG 1]
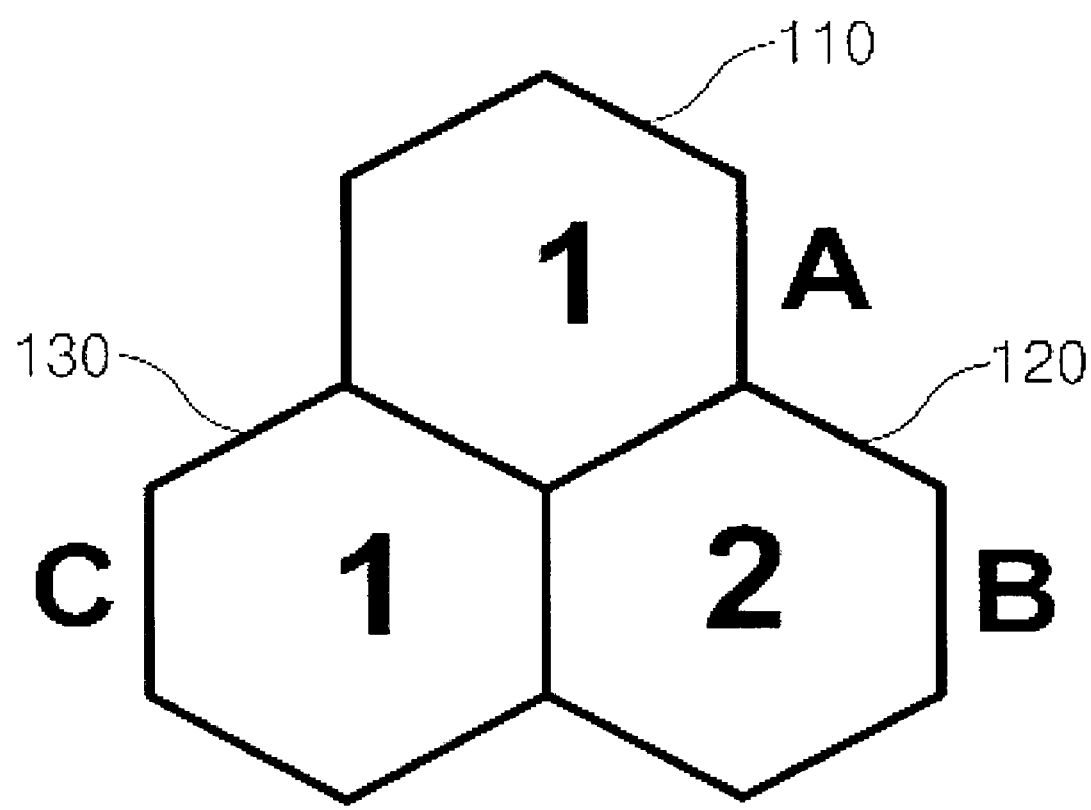

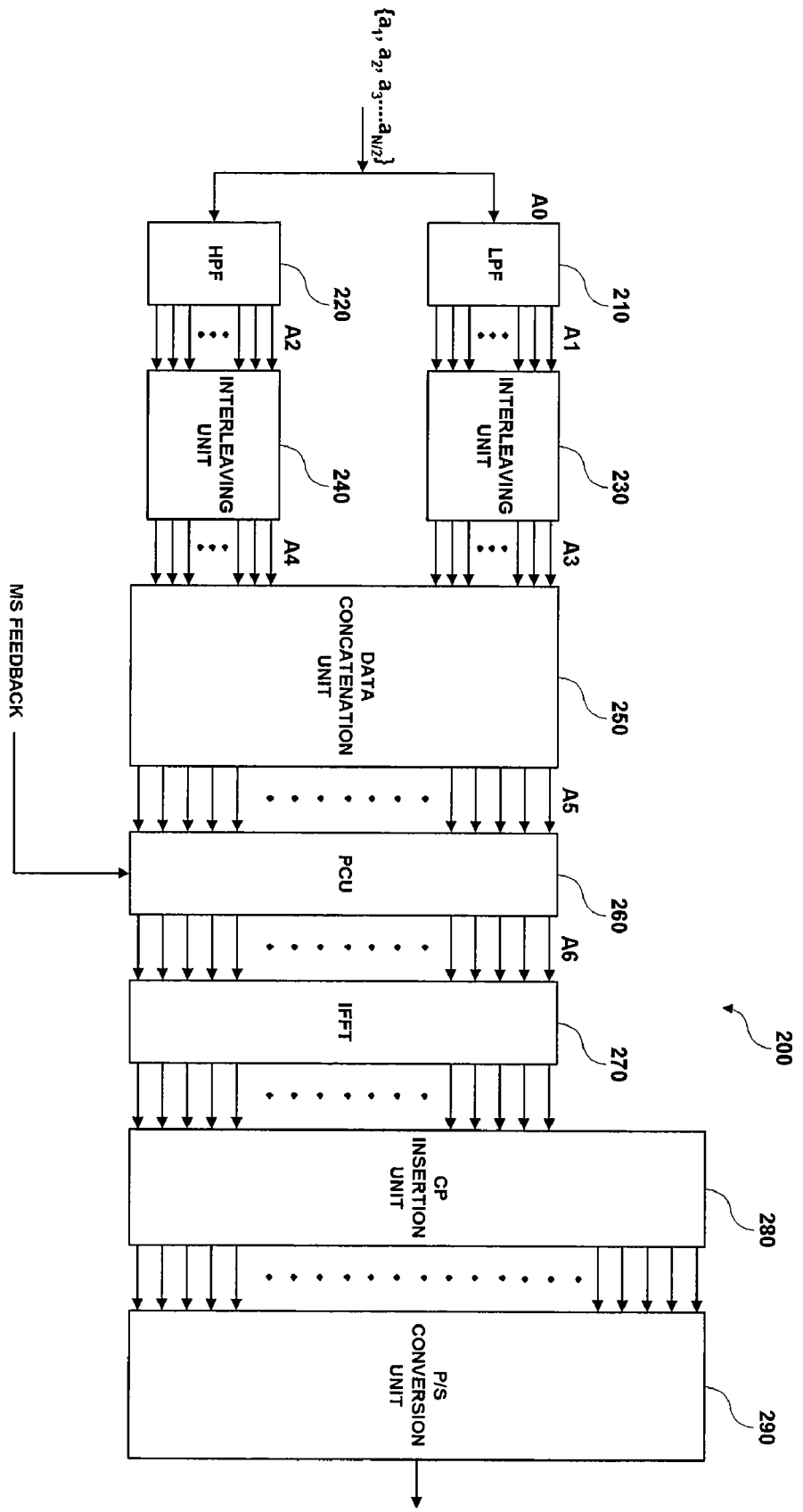
[FIG 2]

[FIG 3]
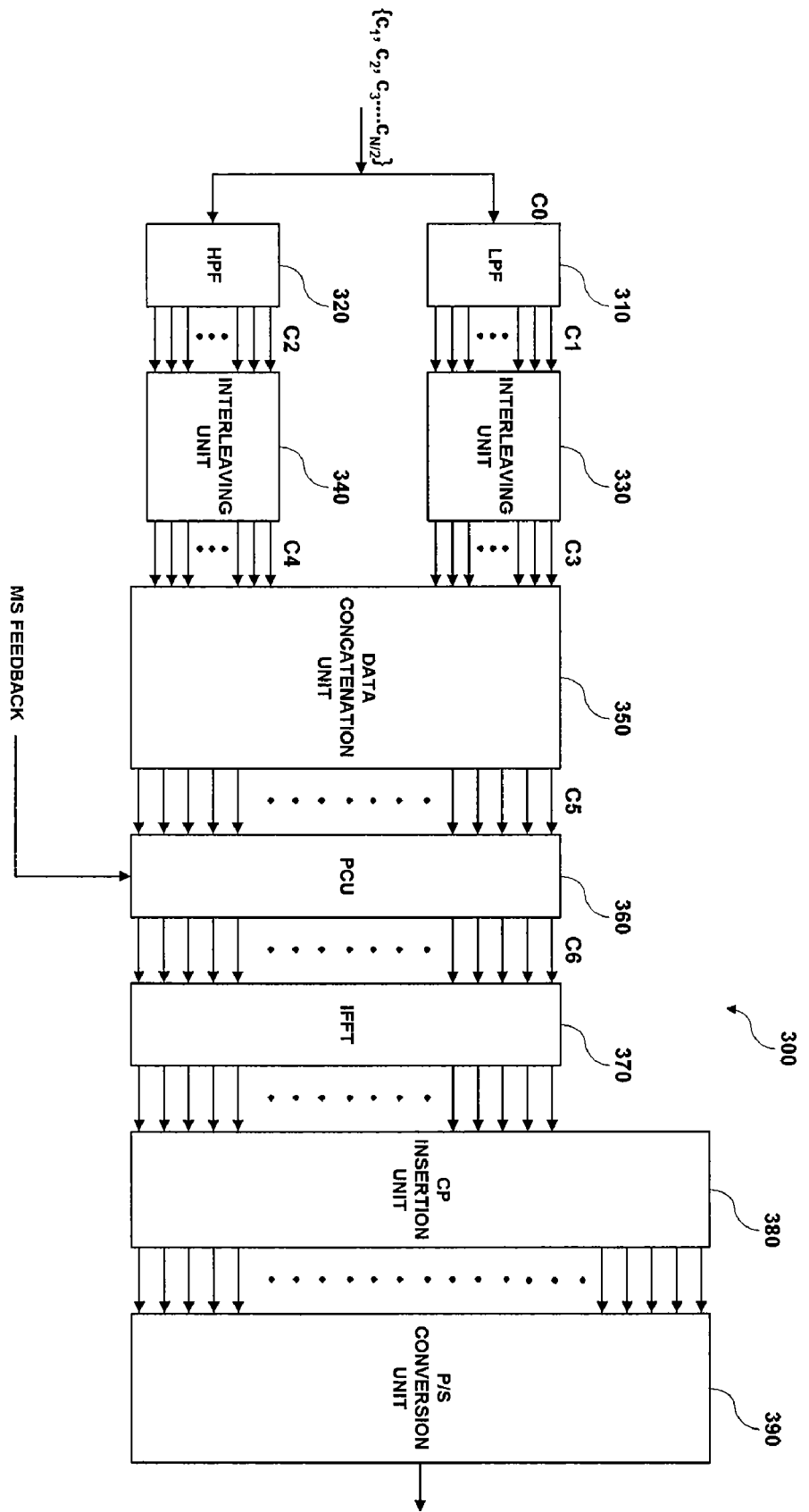

[FIG 4]
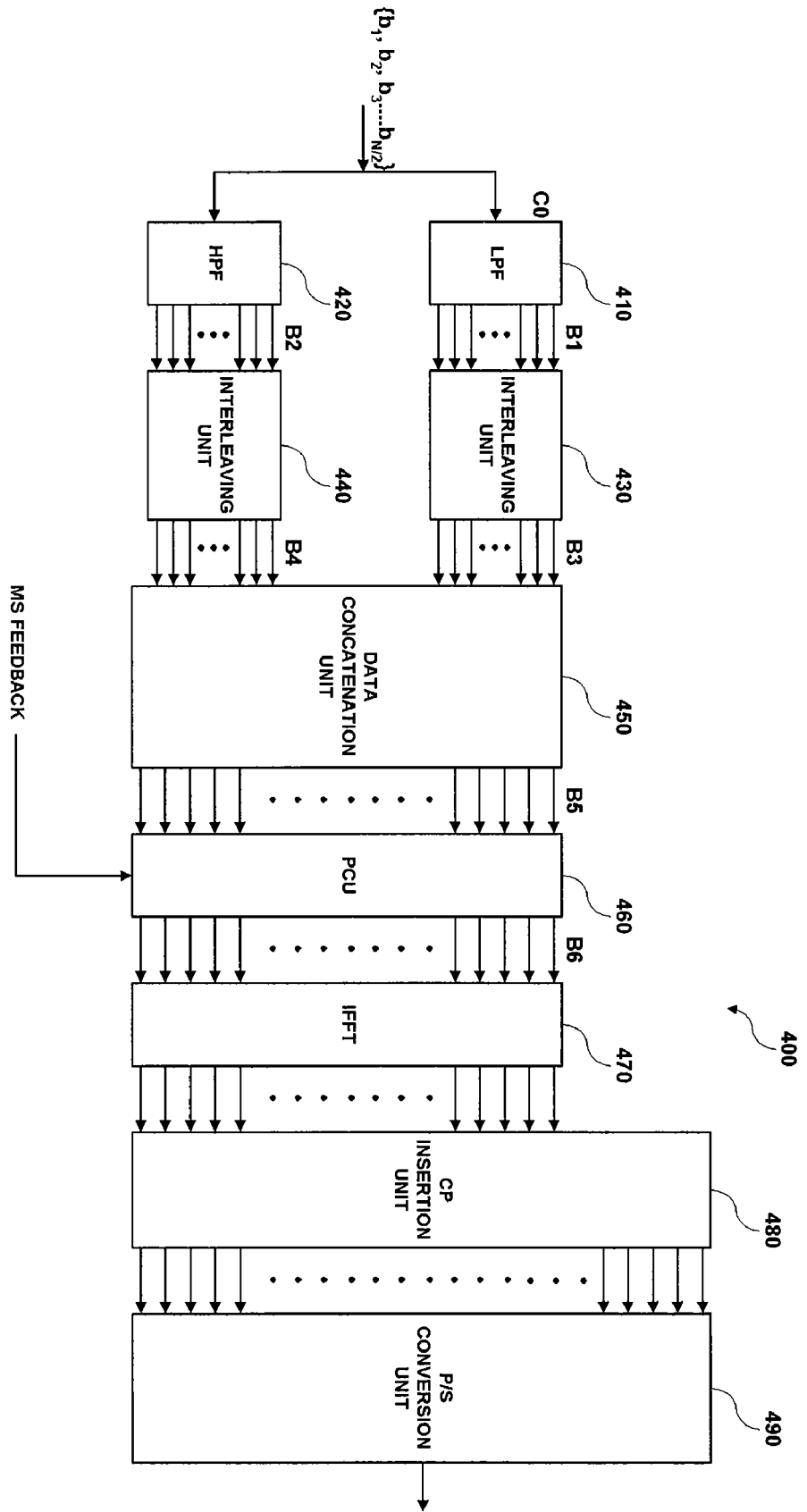

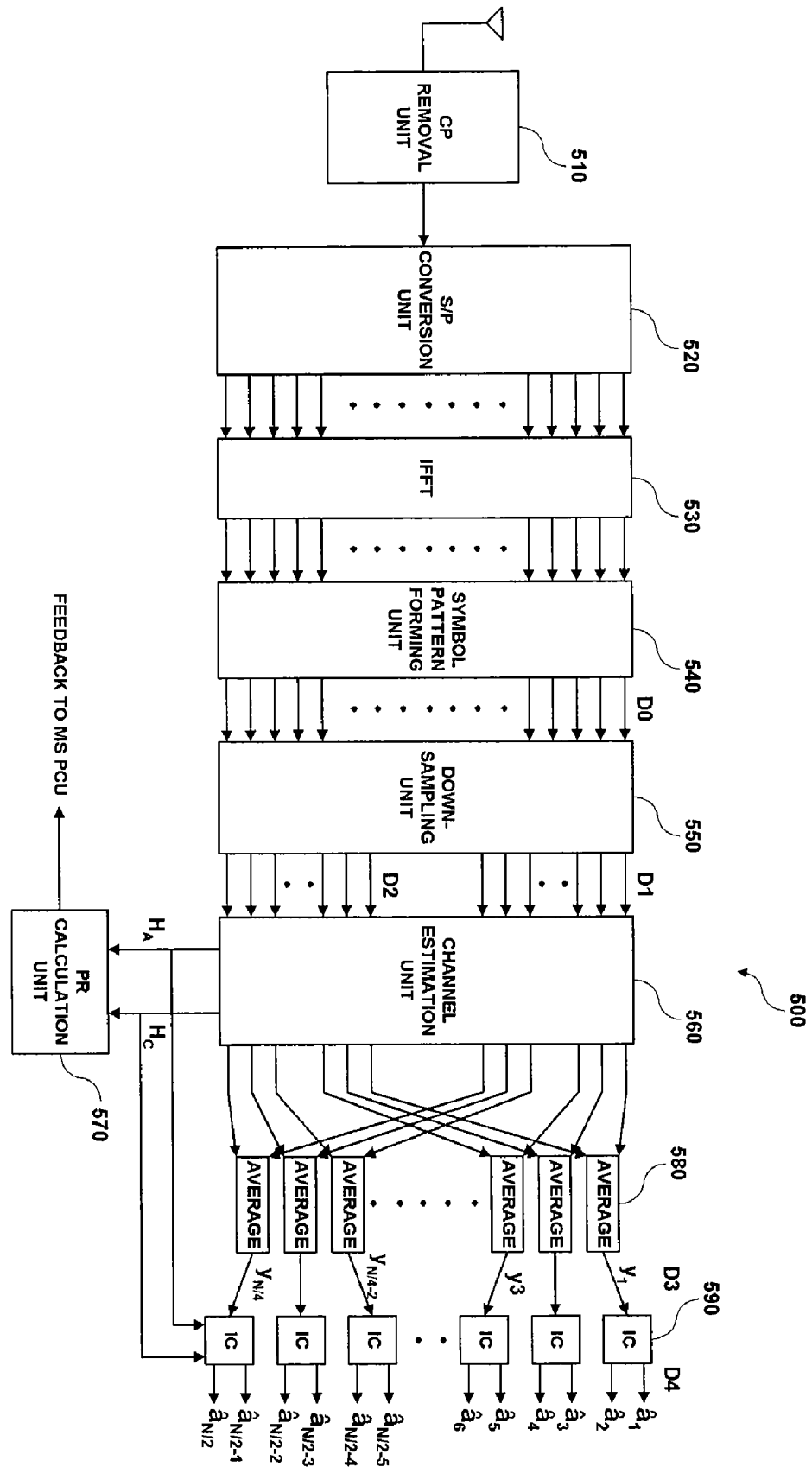

[FIG 6]
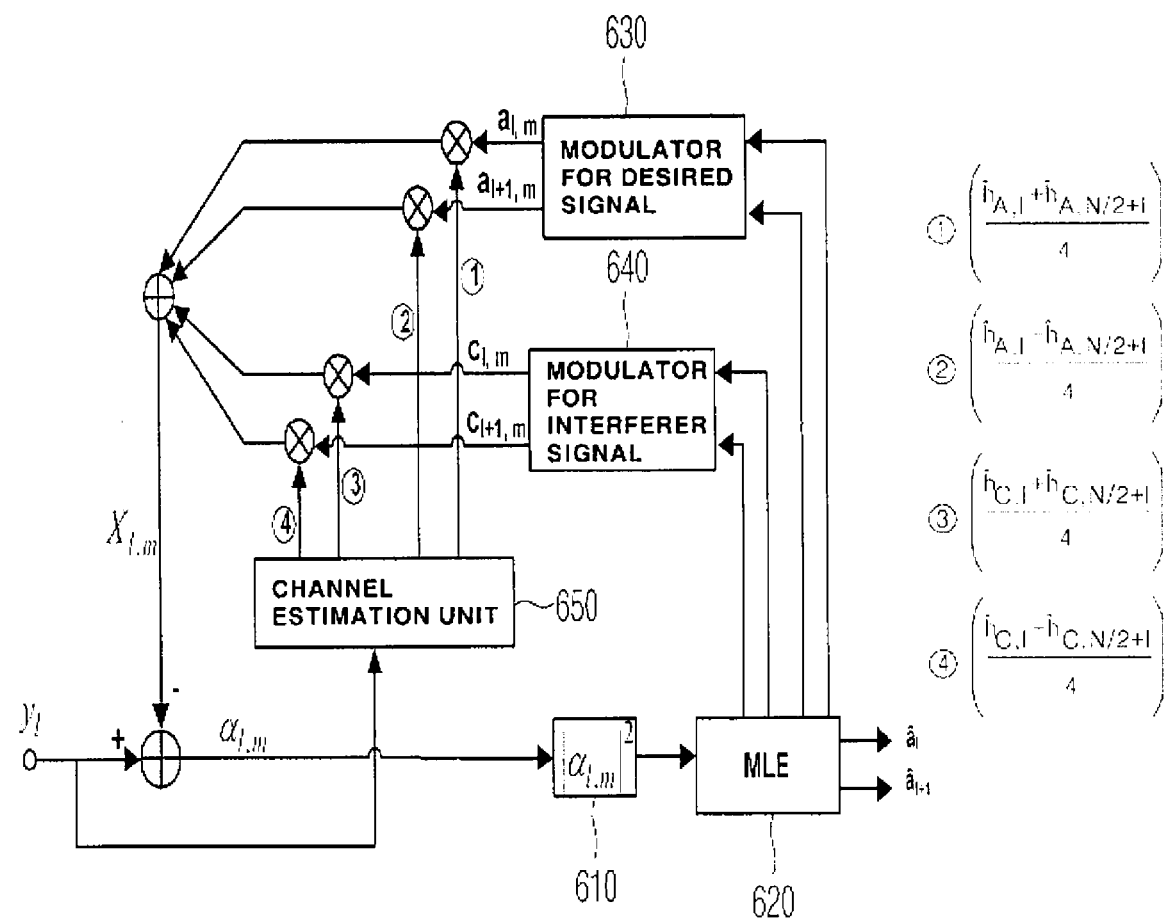

[FIG 7]
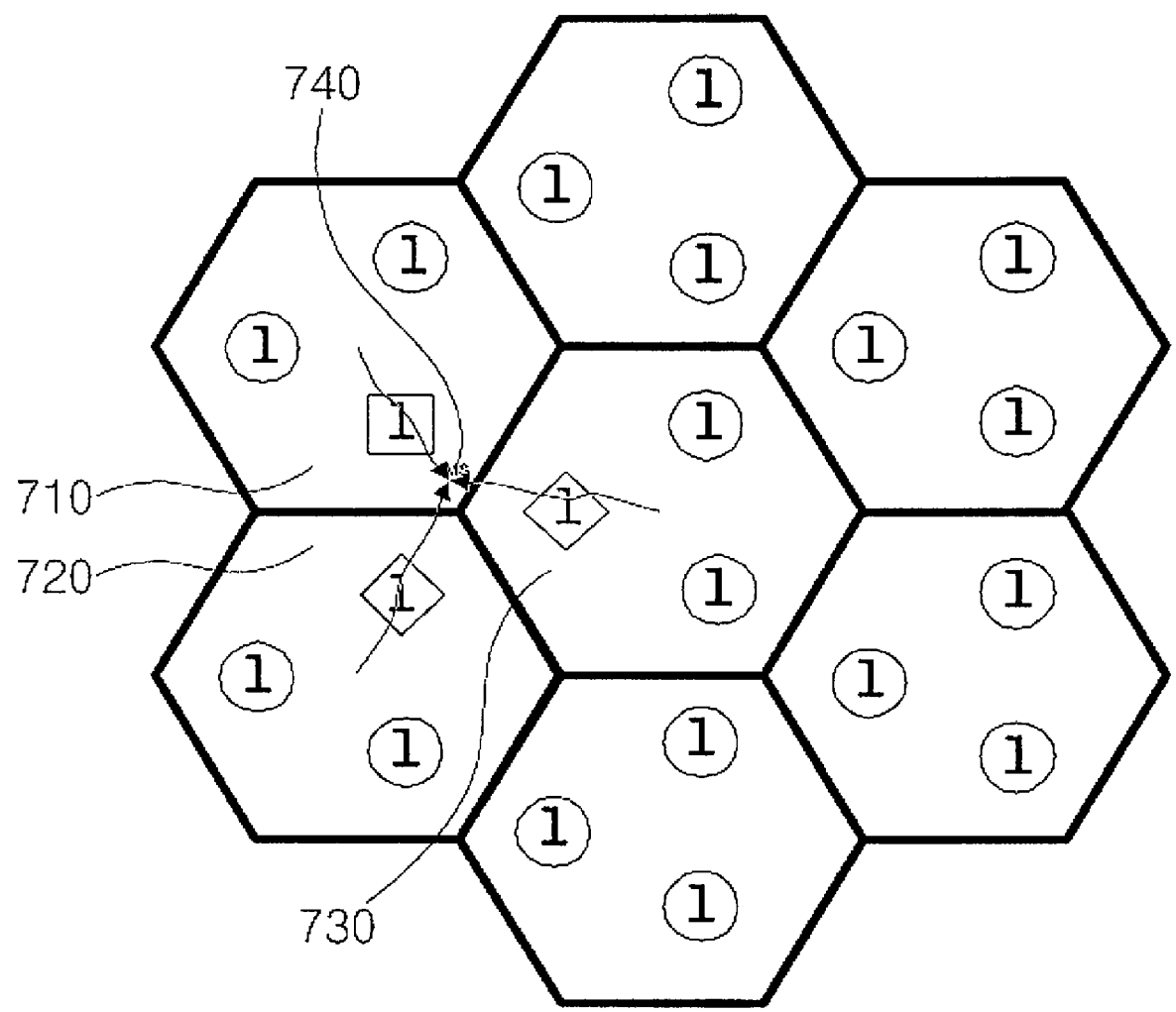

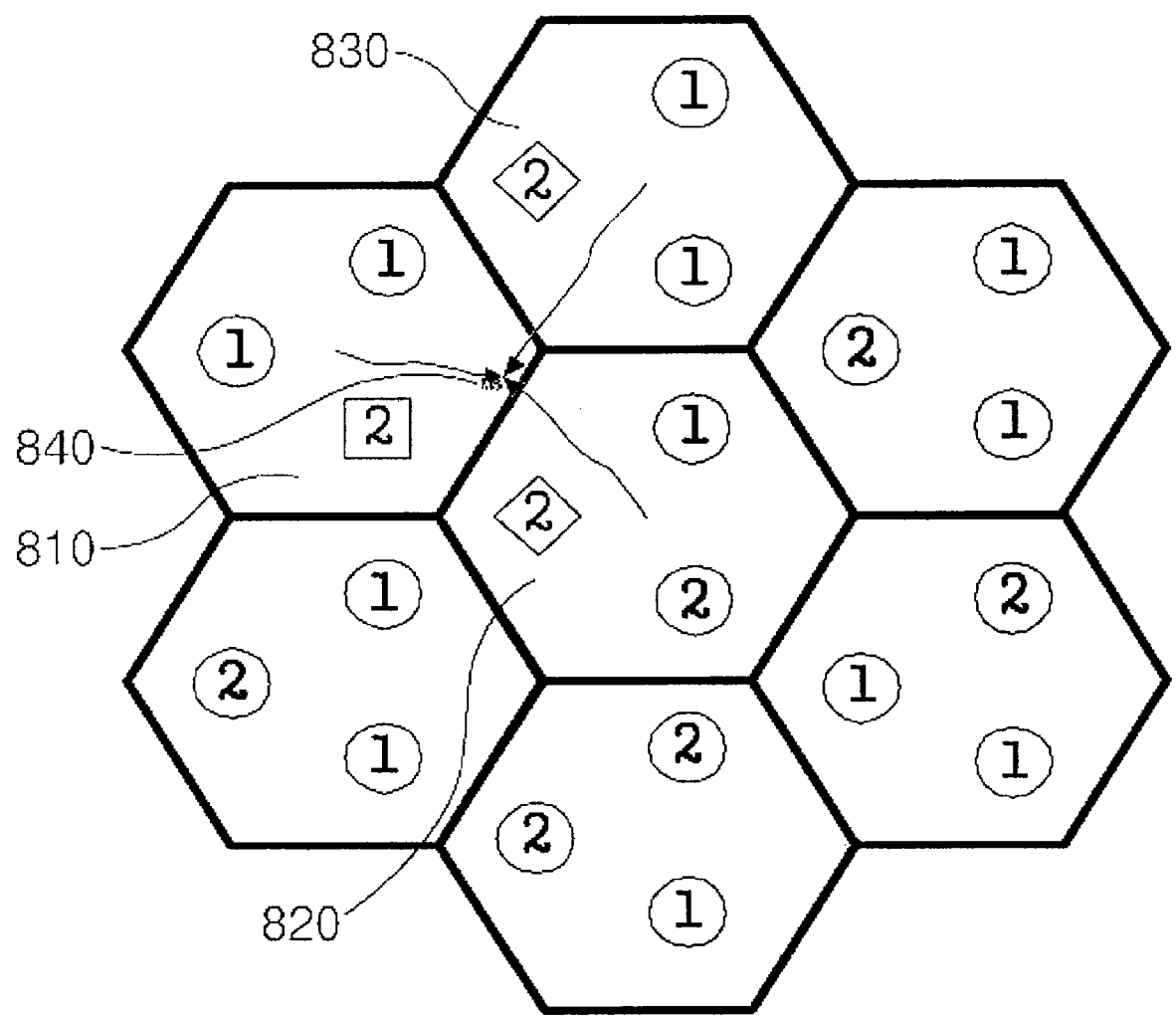
[FIG 8]

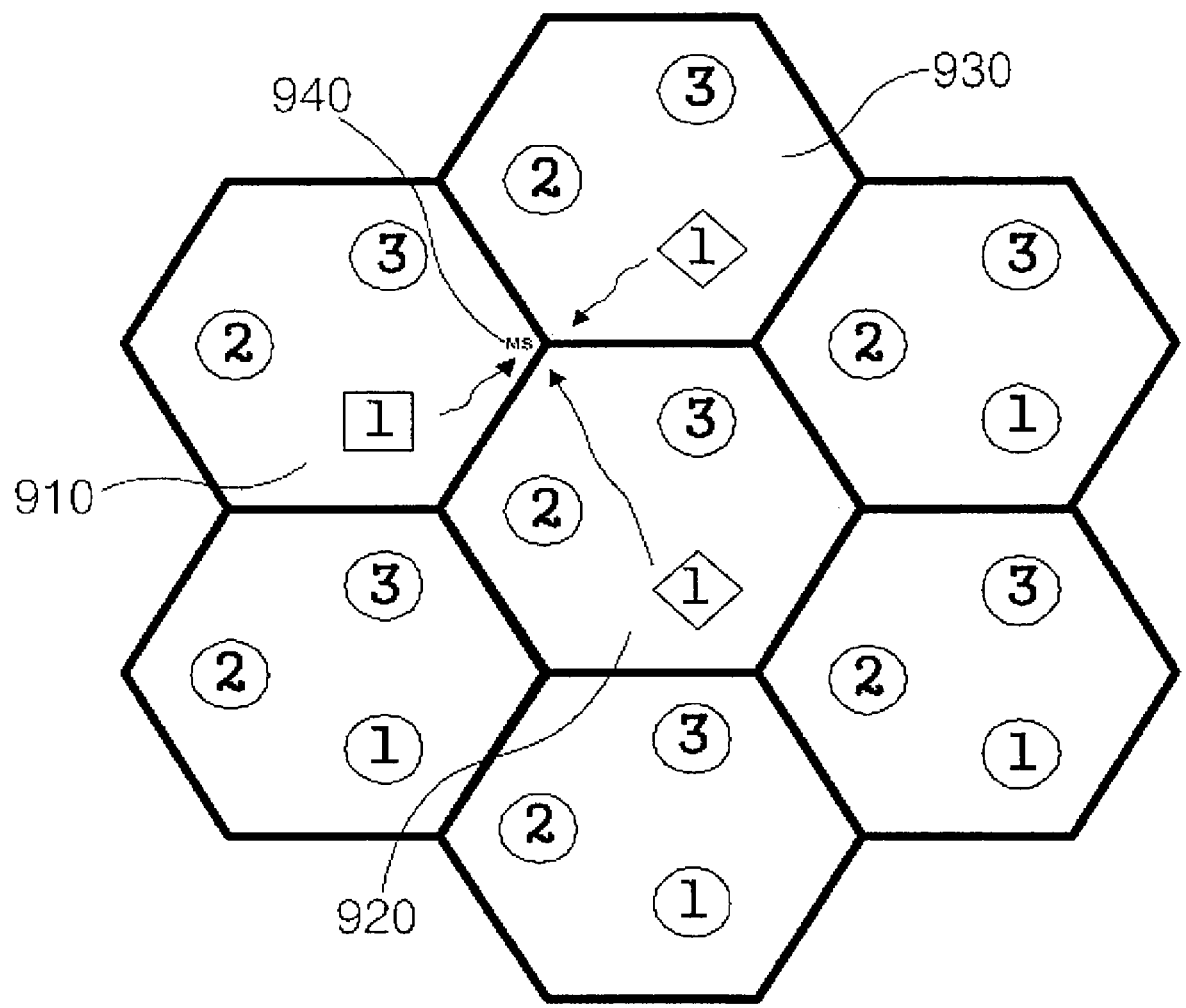
[FIG 9]

SYSTEM AND METHOD FOR CO-CHANNEL INTERFERENCE CANCELLATION IN CELLULAR OFDM SYSTEMS

BACKGROUND OF THE INVENTION

1. Field of the Invention

The present invention relates to cellular orthogonal frequency division multiplexing (OFDM) system, and more particularly, to a system and method for canceling co-channel interference (CCI) in OFDM system.

2. Description of the Related Art

OFDM system is considered as an approach that can satisfy high-speed, high-quality and high-capacity communications required in the fourth generation (4G) wireless communication system. OFDM signal has a plurality of subcarriers with a minimum interval in a frequency domain and data are transmitted in parallel. Therefore, OFDM system can reduce a data rate per subcarrier while maintaining a high overall data rate. In addition, OFDM scheme can provide high-speed, high-quality and high-capacity data communications by increasing the number of the subcarriers.

OFDM system is used efficiently in wireless systems under multipath fading environments. In addition, the use of the cyclic prefix (CP) eliminates the intersymbol interference (ISI) while maintaining the orthogonality between the subcarriers. Furthermore, the OFDM receiver is less complex than single carrier systems which apply equalizers with large number of taps or rake receivers.

To apply OFDM scheme to cellular communication system, frequency reuse is highly required to increase the spectrum efficiency of the system.

However, applying frequency reuse in the cellular communication system leads to CCI due to signals received from different cells. The CCI is considered as one of limiting factors of the overall system capacity. That is, when the frequency reuse is applied in the cellular OFDM network, mobile station (MS) receives, in addition to the desired base station (BS)'s signal, signals arriving from interfering BSs which use the same subcarrier frequencies. This leads to high degradation in the bit error rate (BER) performance and can lead, in severe interference situations, to link drop, i.e., outage, between MS and serving BS. In order to eliminate the CCI effect, CCI cancellers have been proposed. For example, various schemes employing minimum mean squared error (MMSE), MMSE coupled to serial interference canceller (SIC), MMSE coupled to parallel interference canceller (PIC), and maximum likelihood estimation (MLE) have been proposed to implement the CCI canceller.

Among these schemes, MLE scheme having the highest performance generates replicas of the received signals from candidates of the CCI signals and the desired signals. The replicas are generated from all possible weighted combinations of the desired signal and the CCI signals where the weights represent the estimated channels coefficients. The replicas are compared with the received signals. The replica with the minimum Euclidean distance is then selected and the data are detected.

In a conventional receiver with the CCI canceller employing the MLE scheme, the MLE CCI canceller can easily distinguish the desired signal from the interferer signals when the received power of the desired signal is different from that of the interferer signal. As a result, the detection error decreases. On the other hand, the data detection error rate of the MLE CCI canceller increases when the received power of the desired signal is nearly equal to that of the interferer signal under high interference environments such as cell edges. This is because several combinations of the signal candidates may generate similar replica with the minimum Euclidean distance. Therefore, when the received power of the desired signal is nearly equal to that of the interferer signal, the conventional MLE CCI canceller has difficulty in distinguishing the desired signal from the interferer signal.

SUMMARY OF THE INVENTION

An advantage of the present invention is that it provides MLE CCI cancellation system combined with closed-loop power control (CPC) scheme, which can efficiently eliminate the CCI occurring in OFDM system, especially the CCI occurring at cell edges.

Another advantage of the present invention is that it provides a CCI cancellation system, a modified BS transmitter, and a modified MS receiver, which can efficiently operate even under high interference environment such as cell edges.

A further advantage of the present invention is that it provides a CCI cancellation system and method that can reduce the narrowband interference effect by spreading the energy of transmitting symbols over two subcarriers to get frequency diversity, thereby reducing the BER degradation caused by CCI.

Additional aspect and advantages of the present general inventive concept will be set forth in part in the description which follows and, in part, will be obvious from the description, or may be learned by practice of the general inventive concept.

According to an aspect of the invention, a system for canceling co-channel interference (CCI) in a cellular orthogonal frequency division multiplexing (OFDM) system includes: a mobile station (MS) receiver including a feedback generation unit for generating a feedback to a base station (BS) so as to control a transmission power of a transmitting frame of the BS, and a maximum likelihood estimation (MLE) CCI cancellation unit for canceling CCI from the symbols of the transmitting frame using an MLE scheme; and a BS transmitter including a closed-loop power control unit for controlling the transmission power of the transmitting frame according to the feedback received from the MS such that the received power of the desired signal received at the MS is different from the received power of the interferer signals.

According to another aspect of the present invention, the BS transmitter further includes an energy spreading unit for spreading energy of the symbols of the transmitting frame and transmitting the energy-spread symbols to the closed-loop power control unit.

According to a further aspect of the present invention, the energy spreading unit includes: a lowpass filter and a highpass filter for spreading energy of the symbols by low-pass-filtering and high-pass-filtering the symbols, respectively; a first interleaving unit for interleaving an output of the lowpass filter by setting redundant outputs of the lowpass filter to zero; a second interleaving unit for interleaving an output of the highpass filter by setting redundant output of the highpass filter to zero; and a data concatenation unit for concatenating the interleaved symbols in such a way that the symbols with the same energy outputted from the first and second interleaving units are spread over subcarriers separated by $(N/2)\Delta f$, where N is the number of the subcarriers and $\Delta f$ is the separation between adjacent subcarriers.

According to a further aspect of the present invention, the MS receiver further includes a channel estimation unit for estimating channel transfer function between the BS and the MS, and the feedback generation unit includes a power ratio (PR) calculation unit for calculating a power ratio of an estimated first channel transfer function between a serving BS and the MS to an estimated second (or more) channel transfer function between an interfering BS and the MS.

According to a further aspect of the present invention, the power ratio is used to detect the probability of subcarriers with SIR=0 dB, and the feedback value is determined based on the power ratio and is transmitted to the closed-loop power control unit of the serving BS.

According to a further aspect of the present invention, the feedback value is set to 1 when the power ratio is less than a predetermined threshold, and the feedback value is set to 0 when the power ratio is greater than the predetermined threshold.

According to a further aspect of the present invention, a method for canceling co-channel interference (CCI) in cellular orthogonal frequency division multiplexing (OFDM) system includes: (a) at a mobile station (MS), generating a feedback to the serving base station (BS) so as to control a transmission power of in such a way that SIR value differs from 0 dB; (b), at the BS, controlling a transmission power of a next transmitting frame according to the feedback received at the MS such that received power of desired signal received at the MS is different from received power of interferer signal; and (c) at the MS, as the SIR value is different than 0 dB, the capability of the MLE CCI canceller to distinguish between received signals becomes high and as consequence BER performance is improved.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 illustrates an example of a cellular system with transmitting interleaving patterns indicated inside hexagon cells;

FIG. 2 illustrates the structure of a serving BS A transmitter shown in FIG. 1 according to an embodiment of the present invention;

FIG. 3 illustrates the structure of an interfering BS C transmitter shown in FIG. 1 according to an embodiment of the present invention;

FIG. 4 illustrates the structure of an interfering BS B transmitter shown in FIG. 1 according to an embodiment of the present invention;

FIG. 5 illustrates the structure of an MS receiver having a maximum likelihood estimator (MLE) CCI cancellation unit and a power ratio (PR) calculation unit;

FIG. 6 illustrates the structure of an $I^{th}$ MLE CCI canceller shown in FIG. 5;

FIG. 7 illustrates the application of the CCI cancellation system to a typical cellular OFDM system with only one transmitting interleaving pattern;

FIG. 8 illustrates the application of the CCI cancellation system to a typical cellular OFDM system with two transmitting interleaving patterns; and FIG. 9 illustrates the application of the CCI cancellation system to a typical cellular OFDM system with three transmitting interleaving patterns.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

FIG. 1 illustrates an example of a cellular system with transmitting interleaving patterns indicated inside hexagon cells.

In this embodiment, three BSs indicated by A, B and C are considered where numbers in the hexagons (1 or 2) indicate transmitting interleaving patterns. The BS A represents a serving BS that transmits a desired signal to a specific MS, and the BSs B and C represent interfering BSs that are adjacent to the serving BS A and transmit an interferer signal interfering the desired signal transmitted from the BS A. The BSs A and C uses transmitting interleaving pattern #1 and the BS B uses transmitting interleaving pattern #2.

Hereinafter, BS transmitter and MS receiver applied to the cellular system of FIG. 1 will be described in detail with reference to FIGS. 2 to 6. The extensions of the invention to typical cell arrangements in a mobile communication system will be described in detail with reference to FIGS. 7 to 9.

FIG. 2 illustrates the structure of the serving BS A transmitter shown in FIG. 1 according to an embodiment of the present invention.

Referring to FIG. 2, the serving BS A transmitter 200 includes: filtering units (LPF, HPF) 210 and 220 for spreading energy of each symbol by low-pass-filtering and high-pass-filtering input symbols, respectively; interleaving units 230 and 240 for interleaving the filtered symbols; a data concatenation unit 250 for concatenating the interleaved symbols in such a way that each symbol's energy is spread over two subcarriers separated by $(N/2)\Delta f$; a power control unit (PCU) 260 for controlling power of the outputs of the data concatenation unit 250 according to feedback values received from the MS; an inverse fast Fourier transform (IFFT) 270 for generating the time domain signal; cyclic prefix (CP) insertion unit 280 for inserting CP into each subcarrier; and a parallel-to-serial (P/S) conversion unit 290 for P/S converting the CP-inserted symbols.

As shown in FIG. 2, the modulated symbols A0[N/2×1] are inputted to the serving BS A transmitter 200. A0[N/2×1] is given by $$A0=\{a_1, a_2, a_3, \ldots, a_{N/2}\} \qquad \text{Equation (1)}$$

The inputted modulated symbols A0 are filtered using the lowpass filter (LPF) 210 and the highpass filter (HPF) 220, respectively. The energy of the symbols is spread through the filtering operations.

In this embodiment, the coefficients of the LPF are given by $$H(z)_{LPF} = \frac{1}{2}z^{-1} + \frac{1}{2} \qquad \text{Equation (2)}$$

The coefficients of the HPF are given by $$H(z)_{HPF} = -\frac{1}{2}z^{-1} + \frac{1}{2} \qquad \text{Equation (3)}$$

From Equations (1) and (2), the output of the LPF 210, A1[N/2×1], is given by $$A1 = \left\{\frac{a_1+a_2}{2}, \frac{a_2+a_3}{2}, \frac{a_3+a_4}{2}, \ldots, \frac{a_{N/2}+0}{2}\right\} \qquad \text{Equation (4)}$$

From Equations (1) and (3), the output of the HPF 220, A2[N/2×1], is given by $$A2 = \left\{ \frac{a_1 - a_2}{2}, \frac{a_2 - a_3}{2}, \frac{a_3 - a_4}{2}, \ldots, \frac{a_{N/2} - 0}{2} \right\} \quad \text{Equation (5)}$$

The output A1 of the LPF 210 is inputted to the interleaving unit 230, and the output A2 of the HPF 220 is inputted to the interleaving unit 240. The interleaving units 230 and 240 set even indexed values of the LPF and HPF's outputs to zero. This means that the filtered symbols are interleaved in odd indexed samples. This interleaving pattern is considered as the interleaving pattern #1 indicated in FIG. 1.

Therefore, the output of the interleaving unit 230, A3[N/2×1], is given by $$A3 = \left\{ \frac{a_1 + a_2}{2}, 0, \frac{a_3 + a_4}{2}, 0, \ldots, \frac{a_{N/2-1} + a_{N/2}}{2}, 0 \right\} \quad \text{Equation (6)}$$

In addition, the filtered symbols are interleaved by the interleaving unit 240 in the same manner as the interleaving of the interleaving unit 230. The output of the interleaving unit 240, A4[N/2×1], is given by $$A4 = \left\{ \frac{a_1 - a_2}{2}, 0, \frac{a_3 - a_4}{2}, 0, \ldots, \frac{a_{N/2-1} - a_{N/2}}{2}, 0 \right\} \quad \text{Equation (7)}$$

The data concatenation unit 250 concatenates the outputs A3 and A4 of the interleaving units 230 and 240 in such a way that each symbol's energy is spread over two subcarriers separated by $(N/2)\Delta f$, where N is the number of data subcarriers and $\Delta f$ is the separation between adjacent subcarriers. The output of the concatenation process, A5[N×1], is given by $$A5 = \{A3 \ A4\} \quad \text{Equation (8)}$$
$$= \left\{ \frac{a_1 + a_2}{2}, 0, \frac{a_3 + a_4}{2}, 0, \ldots, \frac{a_{N/2-1} + a_{N/2}}{2}, 0, \right.$$
$$\left. \frac{a_1 - a_2}{2}, 0, \frac{a_3 - a_4}{2}, 0, \ldots, \frac{a_{N/2-1} - a_{N/2}}{2}, 0 \right\}$$

The BS transmitter according to the present invention filters the symbols to be transmitted using the LPF and the HPF, and concatenates the outputs of the LPF and the HPF in such a way that each symbol's energy is held over two subcarriers separated by $(N/2)\Delta f$.

Then, the concatenated output A5 is transmitted to the PCU 260. Using the CPC scheme, the PCU 260 performs a power control of the concatenated output A5 according to feedback values received from the MS.

Specifically, when the feedback value transmitted from the MS to the PCU 260 is "0", the output of the PCU 260, A6[N×1], is equal to the concatenated output A5 and is given by $$A6 = A5 \quad \text{Equation (9)}$$

That is, in this case, the PCU 260 does not boost the transmission power.

On the other hand, when the feedback value transmitted from the MS to the PCU 260 is "1" (transmission power is boosted by 3 dB), the output of the PCU 260, A6[N×1], power is two times that of the concatenated output A5 and is given by $$A6 = \sqrt{2} \times A5 \quad \text{Equation (10)}$$

That is, in this case, the PCU 260 boosts the transmission power by 3 dB (doubles the transmission power). Meanwhile, a method of setting the feedback values transmitted from the MS will be described later.

Then, the output A6 of the PCU 260 is inputted to the IFFT unit 270 and is converted into time domain signal. The time domain signal is inputted to the CP insertion unit 280, where the CP insertion unit 280 adds the CP to the time domain signal. In OFDM system, the symbols are transmitted in symbol units. However, the OFDM symbols are influenced by the previous symbols, while they are transmitted over multipath channels. In order to prevent interference between the OFDM symbols, a guard interval that is longer than a maximum delay spread of the channel is inserted between the successive symbols. Meanwhile, the OFDM symbol period is a sum of an effective symbol period and a guard interval. The effective symbol period is a period where real data are transmitted. A receiver performs a demodulation by obtaining data during the effective symbol period after eliminating the guard interval. In order to prevent the orthogonality from being damaged due to the delay of the subcarrier, the signal of the last period of the effective symbol period is copied and inserted into the guard interval. This signal is called a cyclic prefix (CP).

The CP-added time domain signal is transmitted to the P/S conversion unit 290. The P/S conversion unit 290 P/S converts the time domain signal and transmits the P/S converted signal to the MS.

FIG. 3 illustrates the structure of the interfering BS C transmitter shown in FIG. 1 according to an embodiment of the present invention.

The interfering BS C transmitter 300 of FIG. 3 has the same structure as the serving BS A transmitter of FIG. 2. The interfering BS C transmitter 300 includes: filtering units (LPF, HPF) 310 and 320 for spreading energy of each symbol by low-pass-filtering and high-pass-filtering input symbols, respectively; interleaving units 330 and 340 for interleaving the filtered symbols; a data concatenation unit 350 for concatenating the interleaved symbols in such a way that each symbol's energy is spread over two subcarriers separated by $(N/2)\Delta f$; a PCU 360 for controlling power of the outputs of the data concatenation unit 350 according to feedback values received from the MS; an IFFT unit 370 for generating subcarriers using IFFT; a CP insertion unit 380 for inserting CP into each subcarrier; and a P/S conversion unit 390 for P/S converting the CP-inserted symbols.

As shown in FIG. 3, the input of the modulated symbols C0[N/2×1] is given by $$C0 = \{c_1, c_2, c_3, \ldots, c_{N/2}\} \quad \text{Equation (11)}$$

The inputted modulated symbols C0 are filtered using the LPF 310 and the HPF 320, respectively. The energy of the symbols is spread through the filtering operations.

In this embodiment, the coefficients of the LPF 310 and the HPF 320 are given by Equations (2) and (3), respectively.

Thus, the output of the LPF 310, C1[N/2×1], is given by $$C1 = \left\{ \frac{c_1 + c_2}{2}, \frac{c_2 + c_3}{2}, \frac{c_3 + c_4}{2}, \ldots, \frac{c_{N/2} + 0}{2} \right\}$$  Equation (12)

In addition, the output of the HPF 320, C2[N/2×1], is given by $$C2 = \left\{ \frac{c_1 - c_2}{2}, \frac{c_2 - c_3}{2}, \frac{c_3 - c_4}{2}, \ldots, \frac{c_{N/2} - 0}{2} \right\}$$  Equation (13)

The output C1 of the LPF 310 is inputted to the interleaving unit 330, and the output C2 of the HPF 320 is inputted to the interleaving unit 340. The interleaving units 330 and 340 set even indexed values of the LPF and HPF's outputs to zero. This means that the filtered symbols are interleaved in odd indexed samples. This interleaving pattern is considered as the interleaving pattern #1 indicated in FIG. 1.

Therefore, the output of the interleaving unit 330, C3[N/2×1], is given by $$C3 = \left\{ \frac{c_1 + c_2}{2}, 0, \frac{c_3 + c_4}{2}, 0, \ldots, \frac{c_{N/2-1} + c_{N/2}}{2}, 0 \right\}$$  Equation (14)

In addition, the filtered symbols are interleaved by the interleaving unit 340 in the same manner as the interleaving of the interleaving unit 330. The output of the interleaving unit 340, C4[N/2×1], is given by $$C4 = \left\{ \frac{c_1 - c_2}{2}, 0, \frac{c_3 - c_4}{2}, 0, \ldots, \frac{c_{N/2-1} - c_{N/2}}{2}, 0 \right\}$$  Equation (15)

The data concatenation unit 350 concatenates the outputs C3 and C4 of the interleaving units 330 and 340 in such a way that each symbol's energy is spread over two subcarriers separated by (N/2)Δf. The output of the concatenation process, C5[N×1], is given by $$\begin{aligned} C5 &= \{C3 \ C4\} \\ &= \left\{ \frac{c_1 + c_2}{2}, 0, \frac{c_3 + c_4}{2}, 0, \ldots, \frac{c_{N/2-1} + c_{N/2}}{2}, 0, \right. \\ &\left. \frac{c_1 - c_2}{2}, 0, \frac{c_3 - c_4}{2}, 0, \ldots, \frac{c_{N/2-1} - c_{N/2}}{2}, 0 \right\} \end{aligned}$$  Equation (16)

Then, the concatenated output C5 is transmitted to the PCU 360. Using the CPC scheme, the PCU 360 performs a power control of the concatenated output C5 according to feedback values received from the MS.

Specifically, when the feedback value transmitted from the MS to the PCU 360 is "0", the output of the PCU 360, C6[N×1], is equal to the concatenated output C5 and is given by $$C6 = C5$$  Equation (17)

That is, in this case, the PCU 360 does not boost the transmission power.

On the other hand, when the feedback value transmitted from the MS to the PCU 360 is 1 (transmission power is boosted by 3 dB), the output of the PCU 360, A6[N×1], power is two times that of the concatenated output C5 and is given by $$C6 = \sqrt{2} \times C5$$  Equation (18)

That is, in this case, the PCU 360 boosts the transmission power by 3 dB (doubles the transmission power). Meanwhile, a method of setting the feedback values transmitted from the MS will be described later.

Then, the output C6 of the PCU 360 is inputted to the IFFT unit 370 and is converted into time domain signal. The time domain signal is inputted to the CP insertion unit 380, and the CP insertion unit 380 adds the CP to the time domain signal. The CP-added time domain signal is transmitted to the P/S conversion unit 390. The P/S conversion unit 390 P/S converts the time domain signal and transmits the P/S converted signal to the MS.

FIG. 4 illustrates the structure of an interfering BS B transmitter shown in FIG. 1 according to an embodiment of the present invention.

A structure of the interfering BS B transmitter 400 of FIG. 4 is similar to those of the serving BS A transmitter and the interfering BS C transmitter. Referring to FIG. 4, the interfering BS B transmitter includes: filtering units (LPF, HPF) 410 and 420 for spreading energy of each symbol by low-pass-filtering and high-pass-filtering input symbols, respectively; interleaving units 430 and 440 for interleaving the filtered symbols; a data concatenation unit 450 for concatenating the interleaved symbols in such a way that each symbol's energy is spread over two subcarriers separated by (N/2)Δf; a PCU 460 for controlling power of the outputs of the data concatenation unit 450 according to feedback values received from the MS; an IFFT modulation unit 470 for generating subcarriers using IFFT; a CP insertion unit 480 for inserting CP into each subcarrier; and a P/S conversion unit 490 for P/S converting the CP-inserted symbols.

Although the structure of the interfering BS B transmitter is similar to those of the serving BS A transmitter and the interfering BS C transmitter, there is a difference between them is that the interfering BS B transmitter applies an interleaving pattern #2 as shown in FIG. 1. That is, as shown in FIGS. 2 and 3, the interleaving units 230 and 330 of the serving BS A transmitter and the interleaving units 240 and 340 of the interfering BS C transmitter generate the interleaving pattern #1 by setting the even indexed values of the LPF and HPF's outputs to zero. On the other hand, as shown in FIG. 4, the interleaving units 430 and 440 of the interfering BS B transmitter shifts the outputs B1 and B2 of the LPF 410 and the HPF 420 to the right one sample before the concatenation of the data by the concatenation unit 450, and then sets the odd indexed symbol values, instead of the even indexed symbol values, to zero. In this way, the interleaving units 430 and 440 of the BS B transmitter applies the interleaving pattern #2 to the filtered symbols B1 and B2.

FIG. 5 illustrates the structure of an MS receiver having an MLE CCI cancellation unit and a power ratio (PR) calculation unit.

Referring to FIG. 5, a CP removal unit 510 removes the CP from the time domain signal transmitted from the BS A, B and C to the MS 500. Then, the time domain signal is transmitted to a serial-to-parallel (S/P) conversion unit 520 and is converted into N parallel signals. FFT unit 530 generates frequency domain signals by applying FFT to the N parallel signals. Meanwhile, because the interleaving pattern #1 is used for the desired BS (BS A), the even indexed symbols, that are not used, are set to zero in the symbol pattern forming unit 540. Therefore, the even indexed values of the vector D0[N×1] outputted from the symbol pattern forming unit 540 are set to. As a result, the transmitting symbols of the BS B does not exist in the output vector D0. Therefore, the CCI is a problem only between the transmitting symbols of BS A and BS C. Specifically, the output data vector D0[N×1] of the symbol pattern forming unit 540 is given by $$D0 = \left\{ h_{A,1}\left(\frac{a_1 + a_2}{2}\right) + h_{C,1}\left(\frac{c_1 + c_2}{2}\right), 0, \ldots , \right.$$
$$h_{A,N/2-1}\left(\frac{a_{N/2-1} + a_{N/2}}{2}\right) + h_{C,N/2-1}\left(\frac{c_{N/2-1} + c_{N/2}}{2}\right),$$
$$0, h_{A,N/2+1}\left(\frac{a_1 - a_2}{2}\right) + h_{C,N/2+1}\left(\frac{c_1 - c_2}{2}\right), 0, \ldots ,$$
$$\left. h_{A,N-1}\left(\frac{a_{N/2-1} - a_{N/2}}{2}\right) + h_{C,N-1}\left(\frac{c_{N/2-1} - c_{N/2}}{2}\right), 0 \right\}$$

Equation (19)

where $h_{X,i}$ is the channel transfer function between the MS and the $X^{th}$ BS at the $i^{th}$ subcarrier.

The data vector D0 is transmitted to a down-sampling unit 550. The down-sampling unit 550 down-samples the necessary values of the data vector D0, i.e., the odd indexed values. Thus, the even indexed values set to zero are removed. In addition, as shown in FIG. 5, the down-sampled data values are deconcatenated into two data vectors D1 and D2 with the same length.

Specifically, the data vector D1[N/4×1] outputted from the down-sampling unit 550 is given by $$D1 = \left\{ h_{A,1}\left(\frac{a_1 + a_2}{2}\right) + h_{C,1}\left(\frac{c_1 + c_2}{2}\right), \ldots , \right.$$
$$\left. h_{A,N/2-1}\left(\frac{a_{N/2-1} + a_{N/2}}{2}\right) + h_{C,N/2-1}\left(\frac{c_{N/2-1} + c_{N/2}}{2}\right) \right\}$$

Equation (20)

In addition, the data vector D2[N/4×1] is given by $$D2 = \left\{ h_{A,N/2+1}\left(\frac{a_1 - a_2}{2}\right) + h_{C,N/2+1}\left(\frac{c_1 - c_2}{2}\right), \ldots , \right.$$
$$\left. h_{A,N-1}\left(\frac{a_{N/2-1} - a_{N/2}}{2}\right) + h_{C,N-1}\left(\frac{c_{N/2-1} - c_{N/2}}{2}\right) \right\}$$

Equation (21)

The data vectors D1 and D2 are transmitted to a channel estimation unit 560. The channel estimation unit 560 estimates the channel transfer function $H_A$ between the BS A and the MS and the channel transfer function $H_C$ between the BS C and the MS. Specifically, the estimated channel transfer function $H_A$[N/2×1] is given by $$H_A = \{\hat{h}_{A,1}, \hat{h}_{A,3}, \ldots , \hat{h}_{A,N-3}, \hat{h}_{A,N-1}\}$$

Equation (22)

The estimated channel transfer function $H_C$[N/2×1] is given by $$H_C = \{\hat{h}_{C,1}, \hat{h}_{C,3}, \ldots , \hat{h}_{C,N-3}, \hat{h}_{C,N-1}\}$$

Equation (23)

The estimated channel transfer functions $H_A$ and $H_C$ are transmitted to a PR calculation unit 570. The PR calculation unit 570 calculates a newly introduced PR as follows:

$$PR = \frac{\sum_{i=1}^{N-1} |\hat{h}_{A,i}|^2}{\sum_{i=1}^{N-1} |\hat{h}_{C,i}|^2} \text{ for odd } i$$

Equation (24)

The PR value is used to indicate the probability of subcarriers having signal-to-interference ratio (SIR)=0 dB. As the number of subcarriers having SIR=0 dB increases, the BER performance is degraded. When the PR value decreases under a certain threshold, for certain average SIR and mobility, the number of subcarriers having SIR=0 dB increases. Consequently, the BER performance is degraded. When this situation is detected, the MS sends a feedback of "1" to the serving BS, asking it to boost the transmission power for the next frame. When the transmission power increases, the PR increases. Thus, the number of subcarriers having SIR=0 dB is reduced and the BER performance is improved. If the PR does not decrease under the predefined threshold, the MS sends a feedback of "0" and the transmission power is not boosted.

In this way, when the received power of the desired signal received from the serving BS A is nearly equal to that of the interferer signal received from the interfering BS C at the cell edges, the feedback of "1" is transmitted to the serving BS A according to the PR and the transmission power of the serving BS A is boosted for the next frame. Thus, the received power of the desired signal and the received power of the interferer signal are controlled to be different from each other. Consequently, the MLE CCI cancellation unit according to the present invention can correctly distinguish the desired signal from the interferer signal when the received power of the desired signal is equal to the received power of the interferer signal at the cell edges.

Then, the data vector D1 and D2 output from the channel estimation unit 560 and the estimated channel transfer functions $H_A$ and $H_B$ are inputted to the MLE CCI cancellation unit 590. At this point, an average calculation unit 580 calculates the average values D3 of the data vectors D1 and D2 and inputs the calculated values to the MLE CCI cancellation unit 590. Specifically, the data vector D3 is given by $$D3 = \frac{D1 + D2}{2} = \left\{ a_1\left(\frac{h_{A,1} + h_{A,N/2+1}}{4}\right) + a_2\left(\frac{h_{A,1} - h_{A,N/2+1}}{4}\right) + \right.$$
$$c_1\left(\frac{h_{C,1} + h_{C,N/2+1}}{4}\right) + c_2\left(\frac{h_{C,1} - h_{C,N/2+1}}{4}\right),$$
$$\ldots , a_{N/2-1}\left(\frac{h_{A,N/2-1} + h_{A,N-1}}{4}\right) +$$
$$a_{N/2}\left(\frac{h_{A,N/2-1} - h_{A,N-1}}{4}\right) +$$
$$c_{N/2-1}\left(\frac{h_{C,N/2-1} + h_{C,N-1}}{4}\right) +$$
$$\left. c_{N/2}\left(\frac{h_{C,N/2-1} - h_{C,N-1}}{4}\right) \right\}$$

Equation (25)

The summation process [D1+D2] is element-wise summation. That is, the summation process means that the corresponding elements of the data vectors D1 and D2 are summed.

FIG. 6 illustrates the structure of the $I^{th}$ MLE CCI cancellation unit shown in FIG. 5. The MLE CCI cancellation unit is designed according to Equation (25).

An MLE unit 620 generates all the candidate combinations of the transmitted bit streams from the BS A and the BS C. The generated signal candidates generated from the MLE unit 620 are modulated with the same modulators 630 and 640 used at the BS A transmitter and the BS C transmitter, respectively. The modulated symbols $a_{I,m}$, $a_{I+1,m}$, $c_{I,m}$ and $c_{I+1,m}$ are weighted using the estimated channel transfer functions ①, ②, ③ and ④ and are then combined to generate the replica $X_{I,m}$ which is compared to the $I^{th}$ subcarrier received signal $Y_I$=D3(I) received at the $I^{th}$ MLE CCI cancellation unit 590. The estimated channel transfer function ①, ②, ③ and ④ are given by $$\frac{\hat{h}_{A,1} + \hat{h}_{A,N/2+1}}{4}, \frac{\hat{h}_{A,1} - \hat{h}_{A,N/2+1}}{4}, \frac{\hat{h}_{C,1} + \hat{h}_{C,N/2+1}}{4},$$

and $$\frac{\hat{h}_{C,1} - \hat{h}_{C,N/2+1}}{4},$$

respectively.

Then, the $m^{th}$ replica $X_{I,m}$ is subtracted from the $I^{th}$ subcarrier received signal $Y_I$ to obtain Euclidean distance $|\alpha_{1,m}|$. A squared Euclidean generation unit 610 generates the squared Euclidean distance $|\alpha_{1,m}|^2$ by squaring the Euclidean distance $|\alpha_{1,m}|$. The squared Euclidean distance between the received signal $y_I$ and the generated $m^{th}$ replica $X_{I,m}$ is given by $$|\alpha_{1,m}|^2 = |y_1 - X_{1,m}|^2 \quad \text{Equation (26)}$$

$$= \left| y_1 - \left\{ a_1 \left( \frac{\hat{h}_{A,1} + \hat{h}_{A,N/2+1}}{4} \right) + a_{l+1} \left( \frac{\hat{h}_{A,1} - \hat{h}_{A,N/2+1}}{4} \right) + c_1 \left( \frac{\hat{h}_{C,1} + \hat{h}_{C,N/2+1}}{4} \right) + c_{l+1} \left( \frac{\hat{h}_{C,1} - \hat{h}_{C,N/2+1}}{4} \right) \right\} \right|^2$$

Then, the MLE unit 620 selects the replica with the minimum squared Euclidean distance $|\alpha_{1,m}|^2$, and estimates the data sequence D4[N/2×1] transmitted from the serving BS A using the replica. The estimated data sequence D4[N/2×1] is given by $$D4 = \{\hat{a}_1, \hat{a}_2, \hat{a}_3, \ldots, \hat{a}_{N/2-1}, \hat{a}_{N/2}\} \quad \text{Equation (27)}$$

where $\hat{a}_j$ is the estimated bits represented by the symbol $a_j$.

At the MS receiver, the MLE CCI cancellation unit is used to remove the CCI signal from each subcarrier. That is, the replicas are generated from the signal candidates weighted using the channel transfer functions. Then, the replica with the minimum Euclidean distance is selected and the data is detected. Meanwhile, when the received power of the desired signal is nearly equal to the received power of the interferer signals, that is, SIR=0 dB (especially, when the MS is located at the cell edge), different replicas may result in the same minimum Euclidean distance. Consequently, the BER performance is degraded due to the ambiguity in the conventional MLE CCI cancellation unit. However, the MLE CCI cancellation unit according to the present invention can solve the problem of the conventional MLE CCI cancellation unit by using the CPC scheme. For example, at frame k, the MS calculates the newly introduced parameter, power ratio (PR), which is related to the probability of the subcarriers having SIR=0 dB. Consequently, when the received power of the interferer signal is nearly equal to the received power of the desired signal so that the PR decreases under a certain threshold, that is, the probability of SIR=0 dB increases, the MS sends a feedback value of "1" to the serving BS, where the serving BS boosts the transmission power of the frame k+1 by 3 dB (doubles the transmission power). As a result, the received power of the desired signal becomes higher than the received power of the interfering BS, decreasing the data detection inaccuracy occurring in the conventional MLE CCI cancellation unit.

Hereinafter, the extensions of the CCI cancellation system to typical cellular OFDM systems will be described. To apply the invention in a more general and realistic OFDM cellular network, where a plurality of adjacent cells exists, three different embodiments will be described below.

1. Using Only One Transmitting Interleaving Pattern

FIG. 7 illustrates the application of the CCI cancellation system to a typical cellular OFDM system with only one transmitting interleaving pattern.

Referring to FIG. 7, each cell is divided into three sectors. When each sector uses only one transmitting interleaving pattern #1, the network does not use the transmitting interleaving patterns and thus the symbol energy spreading is not applied. In this case, more than one interferer can be considered to be cancelled in the MLE CCI cancellation unit. As shown in FIG. 7, two interferer cells 720 and 730 are considered to be cancelled in the MLE CCI cancellation unit of the MS 740 (interleaving patterns of the interferer cells 720 and 730 are included in a diamond form, and interleaving patterns of the serving cell 710 are included in a square form).

Thus, the PR value of Equation (24) is modified to consider more interfering signals. The modified PR value is given by $$PR = \frac{\sum_{i=1}^{N} |\hat{h}_{A,i}|^2}{\sum_{k=1}^{K} \sum_{i=1}^{N} |\hat{h}_{k,i}|^2} \quad \text{Equation (28)}$$

where K is the number of interferer signals considered to be cancelled at the MLE CCI cancellation unit. In this case, K=2.

2. Using Two Transmitting Interleaving Patterns

FIG. 8 illustrates the application of the CCI cancellation system to a typical cellular OFDM system with two transmitting interleaving patterns.

Referring to FIG. 8, each cell is divided into three sectors. Each cell uses two transmitting interleaving patterns #1 and #2 (interleaving patterns of the interferer cells 820 and 830 are included in a diamond form, and interleaving patterns of the serving cell 810 are included in a square form). Like in the OFDM system of FIG. 1, the frequency diversity is obtained by spreading the energy of each symbol over two different subcarriers. In addition, the MLE CCI cancellation unit assisted by the CPC scheme is used to cancel interferer signals arriving at the MS 840 from the BSs of the interferer cells 820 and 830. In the MLE CCI cancellation unit, more than one interferer signal can be considered and this leads to more BER performance improvement. In this case, because more than two interferer signals can be considered, the PR value is given by Equation (28). Compared with the case of FIG. 7, the distance between the cells using the same frequencies increases, but the level of interference decreases.

3. Using Three Transmitting Interleaving Patterns

FIG. 9 illustrates the application of the CCI cancellation system to a typical cellular OFDM system with three transmitting interleaving patterns.

Referring to FIG. 9, each cell is divided into three sectors. Each cell uses three transmitting interleaving patterns #1, #2 and #3 (interleaving patterns of the interferer cells 920 and 930 are included in a diamond form, and interleaving patterns of the serving cell 910 are included in a square form). Like in the OFDM system of FIG. 1, the frequency diversity is obtained by spreading the energy of each symbol over two different subcarriers. In addition, the MLE CCI cancellation unit based on the CPC scheme is used to cancel more than one interferer signals arriving at the MS 940 from the BSs of the interferer cells 920 and 930. In the MLE CCI cancellation unit, more than two interferer signals can be considered and the PR value is given by Equation (28). Compared with the cases of FIGS. 7 and 8, the distance between the cells using the same frequencies increases, but the level of interference further decreases.

Referring to the cell structure and interleaving patterns of FIGS. 7 to 9, as the number of the transmitting interleaving patterns increases, the distance between the cells using the same frequencies increases and the level of interference becomes lower than the case where only one transmitting interleaving pattern is used. That is, as the number of the transmitting interleaving patterns increases, the overall network spectral efficiency is reduced. However, better CCI cancellation can be obtained. Therefore, the trade-off between the number of the used transmitting interleaving patterns and the interference level should be considered when applying the CCI cancellation unit of the present invention.

According to the present invention, the MLE CCI system assisted with the CPC scheme can efficiently eliminate the CCI occurring in an OFDM system, especially the CCI occurring at cell edges.

In addition, the present invention provides the CCI cancellation system, the modified BS transmitter, and the modified MS receiver, which can efficiently operate even under high interference environment such as cell edges.

Furthermore, the present invention provides a CCI cancellation system and method that can reduce the narrowband interference effect by spreading the energy of transmitting symbols over two subcarriers to get frequency diversity, thereby reducing the BER degradation caused by CCI.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A system for canceling co-channel interference (CCI) in a cellular orthogonal frequency division multiplexing (OFDM) system, comprising:
a mobile station(MS) receiver including a feedback generation unit for generating a feedback to a base station (BS) so as to control a transmission power of the transmitting frame of the BS, and a maximum likelihood estimation (MLE) CCI cancellation unit for canceling CCI signals arriving from neighbor cells; and
a BS transmitter including a closed-loop power control unit for controlling the transmission power of the transmitting frame according to the feedback received from the MS such that received power of desired signal at the MS receiver is different from that of an interferer signal,
wherein the MS receiver further includes a channel estimation unit for estimating channel transfer function between the BS and the MS, and the feedback generation unit includes a power ratio (PR) calculation unit for calculating a power ratio of an estimated first channel transfer function between a serving BS and the MS to an estimated second channel transfer function between an interfering BS and the MS.

2. The system according to claim 1,
wherein the BS transmitter further includes an energy spreading unit for spreading energy of the symbols of the transmitting frame and transmitting the energy-spread symbols to the closed-loop power control unit.

3. The system according to claim 2,
wherein the energy spreading unit includes:
a lowpass filter and a highpass filter for spreading energy of the symbols by low-pass-filtering and high-pass-filtering the symbols, respectively;
a first interleaving unit for interleaving the output of the lowpass filter by setting unused symbols of the output of the lowpass filter to zero;
a second interleaving unit for interleaving the output of the highpass filter by setting unused symbols of the output of the highpass filter to zero; and
a data concatenation unit for concatenating the interleaved symbols in such a way that every data symbol's energy is spread over two subcarriers separated by $(N/2)\Delta f$, where N is the number of the subcarriers and $\Delta f$ is the separation between adjacent subcarriers.

4. The system according to claim 3,
wherein coefficients of the lowpass filter are $\{\frac{1}{2}, \frac{1}{2}\}$ and coefficients of the highpass filter are $\{\frac{1}{2}, -\frac{1}{2}\}$.

5. The system according to claim 3,
wherein the number of kinds of the interleaving patterns existing in one cell is more than two.

6. The system according to any one of claims 1 to 5,
wherein the closed-loop power control unit boos transmission power by 3 dB according to the feedback received from the MS.

7. The system according to claim 6,
wherein the closed-loop power control unit boosts frame transmission power according to the feedback of the MS; the closed-loop power control unit boosts the transmission power when the feedback is "1"; and the closed-loop control unit does not boost the transmission power when the feedback is "0".

8. The system according to claim 1,
wherein the power is used to detect the probability of subcarriers with a signal-to-interference ratio (SIR)=0 dB, and the feedback value is determined based on the power ratio and is transmitted to the closed-loop power control unit of the serving BS.

9. The system according to claim 8,
wherein the feedback value is set to 1 when the power ratio is less than a predetermined threshold, and the feedback value is set to 0 when the power ratio is greater than the predetermined threshold.

10. The system according to claim 8,
wherein the predetermined threshold is dependent on a specific average SIR and mobility which are known to the MS.

11. The system according to claim 1,
wherein the MS receiver further includes:
a down-sampling unit for setting unused samples to 0 according to interleaving patterns formed at the BS, and removing the value of 0 by down-sampling necessary samples; and
a data deconcatenation unit for deconcatenating the down-sampled samples into two vectors with the same length, the two vectors being inputted to the channel estimation unit.

12. The system according to claim 11,
wherein the MS receiver further includes an average calculation unit for calculating an average value of the outputs of the two vectors and outputting the calculated average value to the MLE CCI cancellation unit.

13. The system according to claim 12,
wherein the MLE CCI cancellation unit estimates data sequence of the desired signal by generating replicas and choosing the replica with the minimum Euclidean distance from the received signal.

14. A method for canceling co-channel interference (CCI) in a cellular orthogonal frequency division multiplexing (OFDM) system, comprising:
   (a) at a mobile station (MS), generating a feedback to a base station (BS) so as to control the transmission power of the next frame to be transmitted from the serving BS;
   (b), at the BS, controlling a transmission power of the next transmitting frame according to the feedback received from the MS such that received power of desired signal received at the MS receiver is different from received power of an interferer signal; and
   (c) at the MS, canceling co-channel interference (CCI) signals in the next received frames controlled the transmission power using a maximum likelihood estimation (MLE),
      wherein the operation (a) further includes estimating channel transfer function between the BS and the MS before generating, the feedback, the feedback being generated by calculating a power ratio (PR) of an estimated first channel transfer function between a serving BS and the MS to an estimated second channel transfer function between an interfering BS and the MS.

15. The method according to claim 14,
wherein the operation (b) further includes spreading energy of the data symbols before controlling the transmission power.

16. The method according to claim 15,
wherein the energy spreading operation includes:
spreading energy of the symbols using lowpass filter and highpass filter;
interleaving the output of the lowpass filter by setting unused symbols of the output of the lowpass filter to zero;
interleaving output of the highpass filter by setting unused symbols of the output of the highpass filter to zero; and
concatenating the interleaved symbols in such a way that every symbol's energy, outputted from the interleaving operations, is spread over subcarriers separated by (N/2) Δf, where N is the number of the subcarriers and Δf is the separation between adjacent subcarriers.

17. The method according to claim 16,
wherein coefficients of the lowpass filter are {½, ½} and coefficients of the highpass filter are {½, −½}.

18. The method according to claim 16,
wherein the number of interleaving patterns existing in the network can be more than 1.

19. The method according to one of claims 14,
wherein the transmission power control in the operation (b) includes boosting the transmission power by 3 dB according to the feedback received from the MS.

20. The method according to claim 14,
wherein the transmission power control operation boosts frame transmission power according to the feedback of the MS; the transmission power is boosted when the feedback is 1; and the transmission power is not boosted when the feedback is 0.

21. The method according to claim 14,
wherein the power ratio is used to detect the probability of subcarriers with signal-to-interference ratio (SIR)=0 dB, and the feedback value is determined based on the power ratio and is transmitted to the closed-loop power control unit of the serving BS.

22. The method according to claim 21,
wherein the feedback value is set to 1 when the power ratio is less than a predetermined threshold, and the feedback value is set to 0 when the power ratio is greater than the predetermined threshold.

23. The method according to claim 22,
wherein the predetermined threshold is dependent on a measured average SIR and mobility which are known to the MS.

24. The method according to claim 14,
wherein the operation (a) further includes:
setting unused samples to 0 according to interleaving patterns formed at the BS, and removing the value of 0 by down-sampling necessary samples; and
deconcatenating the down-sampled vectors into two data vectors with the same length,
where channel transfer functions are estimated using these vectors (for Pilot OFDM symbols).

25. The method according to claim 24,
wherein the operation (a) further includes:
calculating an average value of the outputs of the two vectors; and
transmitting the calculated average value to an MLE CCI cancellation unit.

* * * * *